Figure 1:
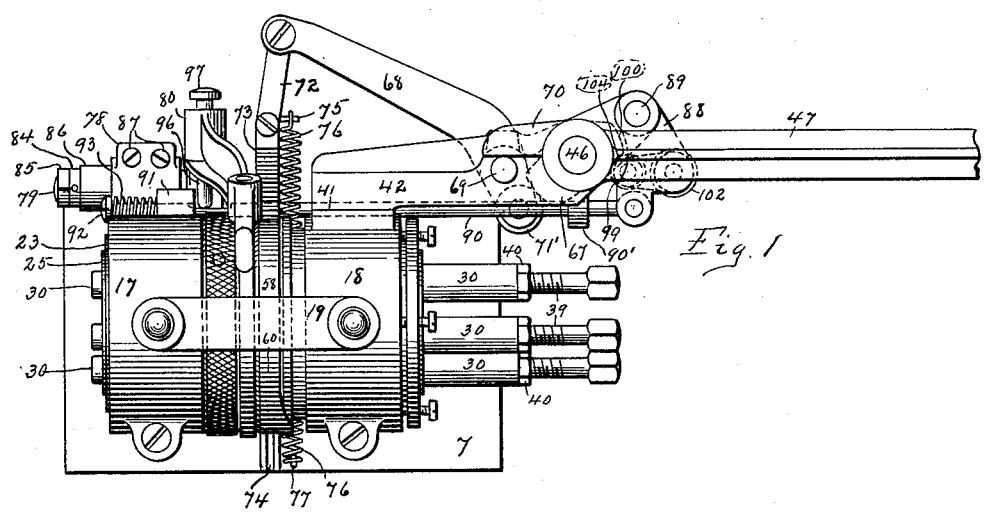

P. CATUCCI.
TURRET LATHE.
APPLICATION FILED DEC. 14, 1912.

1,097,914.

Patented May 26, 1914.

5 SHEETS—SHEET 1.

Witnesses:
Gertrude L. Sanders.
Rose Scally

Pliny Catucci Inventor
By Louis M. Sanders Attorney

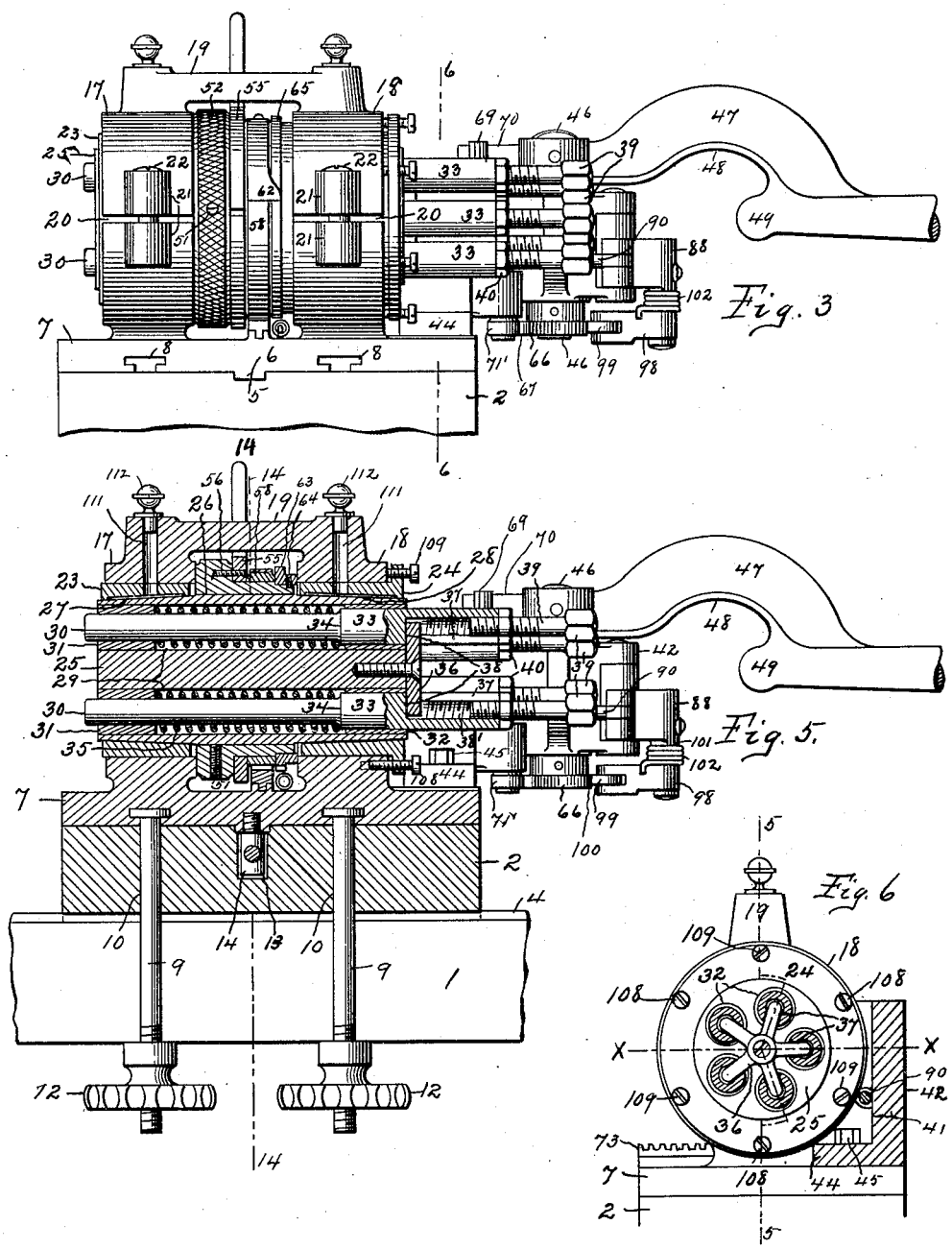

P. CATUCCI.
TURRET LATHE.
APPLICATION FILED DEC. 14, 1912.
1,097,914.
Patented May 26, 1914.
5 SHEETS—SHEET 3.
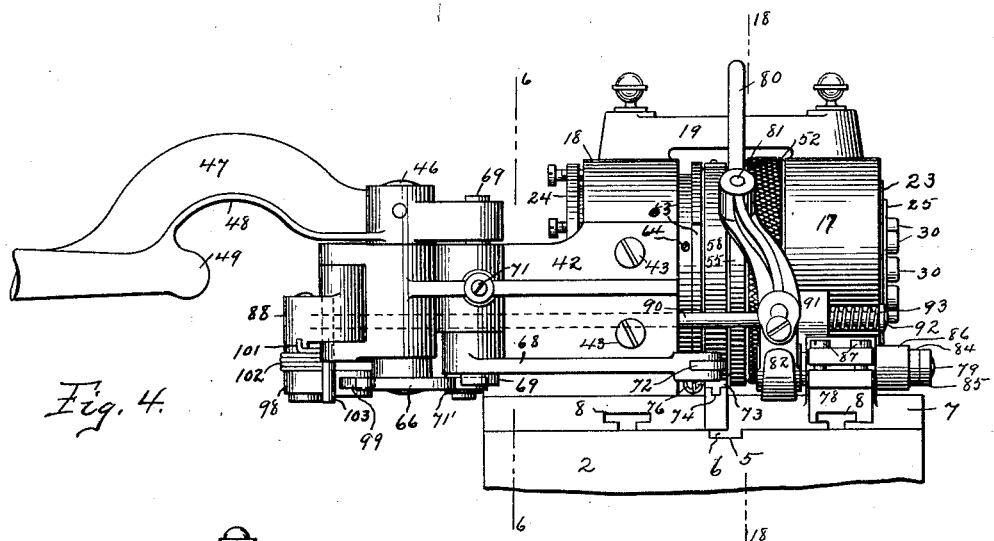
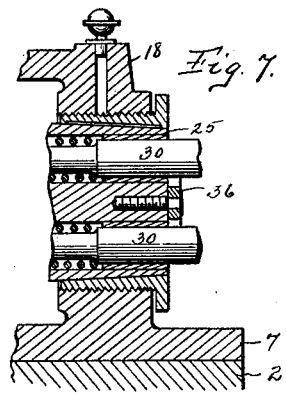
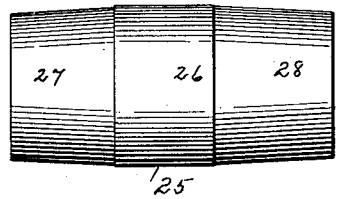
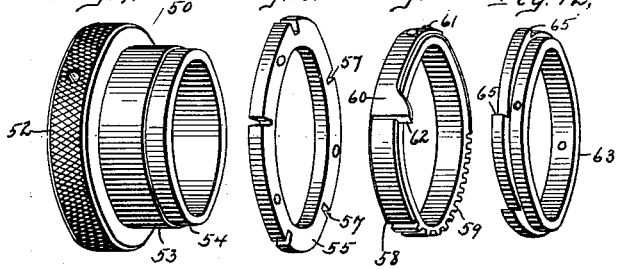

P. CATUCCI.
TURRET LATHE.
APPLICATION FILED DEC. 14, 1912.

1,097,914.

Patented May 26, 1914.
5 SHEETS—SHEET 4.

Witnesses:
Gertrude L. Sanders.
Rosa Scully

Pliny Catucci Inventor
By Louis M. Sanders Attorney

P. CATUCCI.
TURRET LATHE.
APPLICATION FILED DEC. 14, 1912.

1,097,914.

Patented May 26, 1914.

5 SHEETS—SHEET 5.

Witnesses:
Gertrude L. Sanders.
Rosa Scally

Pliny Catucci Inventor
By Louis M. Sanders Attorney

UNITED STATES PATENT OFFICE.

PLINY CATUCCI, OF NEWARK, NEW JERSEY, ASSIGNOR, BY MESNE ASSIGNMENTS, TO MEISSELBACH-CATUCCI MANUFACTURING COMPANY, A CORPORATION OF NEW JERSEY.

TURRET-LATHE.

1,097,914.     Specification of Letters Patent.     Patented May 26, 1914.

Application filed December 14, 1912. Serial No. 736,738.

*To all whom it may concern:*

Be it known that I, PLINY CATUCCI, a citizen of the United States, residing in the city of Newark, county of Essex, and State of New Jersey, have made certain new and useful Improvements in Turret-Lathes, of which the following is a specification.

My invention relates to that class of lathes wherein the work piece is held in the lathe chuck and is operated upon successively by a plurality of cutting or shaping tools which are held rigidly in a special frame or turret head and are brought into position to operate upon the work piece in regular sequence by the attendant or operator. The turret of such lathes has hitherto been mounted upon a fixture which is secured to the lathe bed in any convenient manner, so that the turret which carries the tool spindles may revolve with said spindles in a horizontal plane or upon an oblique axis, so as to bring the tools carried by such spindles into such position as to successively operate upon the work piece.

My improvement contemplates the location of the turret with its axis in a horizontal plane, with the tool spindles parallel to such axis, with means for rotating the turret, step by step, about its axis to bring the tool spindles successively into operative position, the actuation of the turret being accomplished by the manipulation of a single lever.

In carrying out my invention, I make use of several new mechanical principles, all of which are set forth in the following detailed specification and illustrated in the drawings, which accompany this specification, in which—

Figure 2:
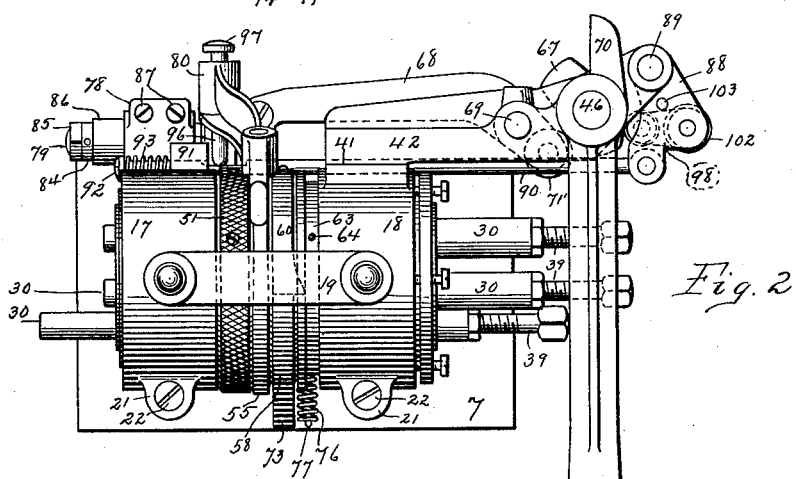
Figure 13:
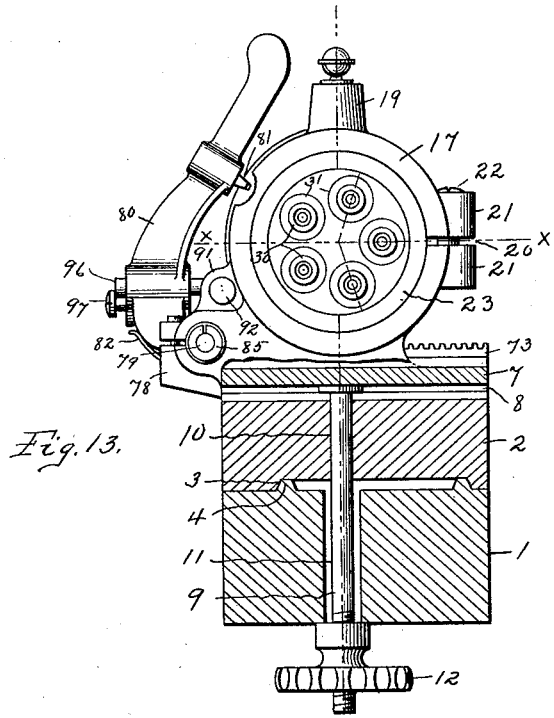
Figure 14:
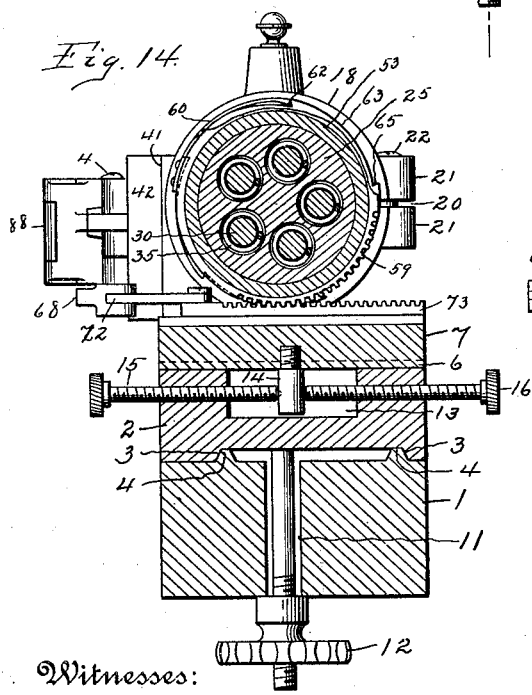
Figure 15:
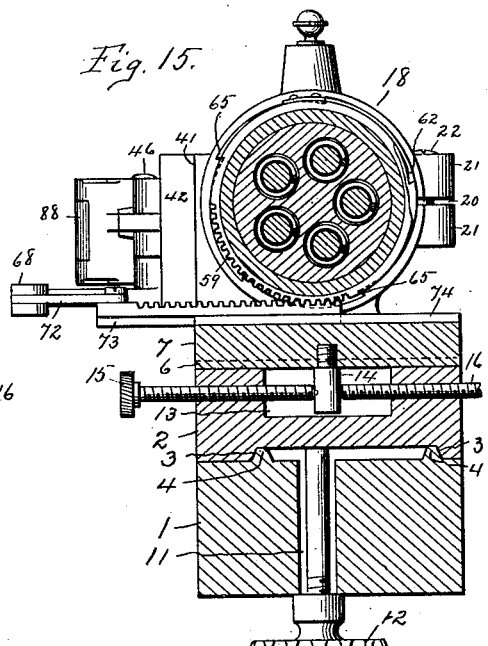
Figure 16:
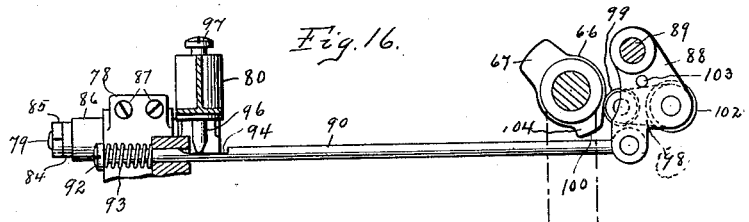
Figure 17:
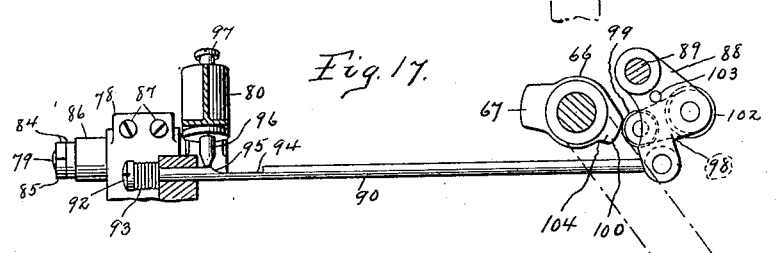
Figure 18:
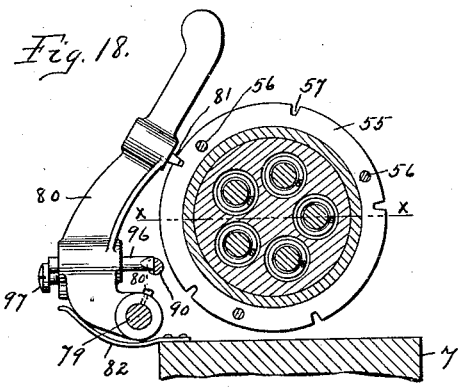
Figure 19:
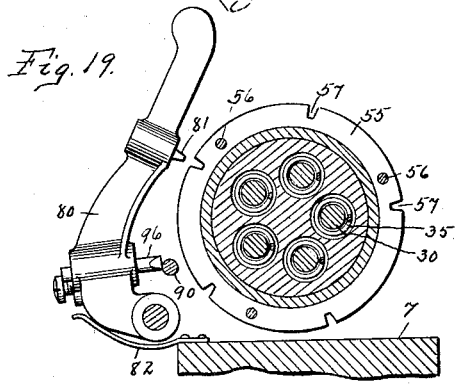
Figure 21:
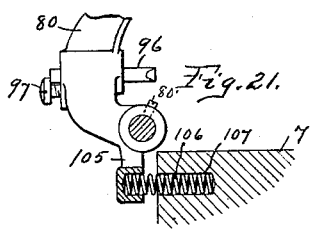
Figure 20:
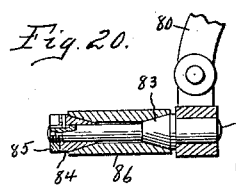

Figure 1 illustrates a plan view of my improved lathe turret with the operating lever in the indexing position. Fig. 2 is a plan view illustrating the operating lever in position to throw a tool spindle into operation. Fig. 3 is a front elevation and Fig. 4 is a rear elevation. Fig. 5 is a vertical section on line 5, 5 of Fig. 6. Fig. 6 is a vertical section on line 6, 6 of Figs. 3 and 4. Fig. 7 is a partial vertical section similar to Fig. 5 illustrating a slight modification of the bearing takeup. Fig. 8 is a side view of the turret barrel. Figs. 9, 10, 11, and 12, are respectively detailed perspective views of the indexing mechanism mounted upon the turret barrel. Fig. 13 is an end elevation partly in section of the lathe turret. Figs. 14 and 15 are respectively vertical cross sectional views on line 14, 14 of Fig. 5 showing the initial and final positions of the indexing mechanism. Figs. 16 and 17 illustrate, in detached plan view, the tripping mechanism for the indexing device. Figs. 18 and 19 are vertical cross sections on line 18, 18 of Fig. 4, showing the index lever in operative and tripped positions respectively. Fig. 20 illustrates the adjustable cone bearing for the index lever. Fig. 21 illustrates a slightly modified form of the spring device for actuating the index lever.

Similar letters of reference refer to like parts throughout the specification and drawings.

My lathe turret is applicable to any ordinary lathe and is designed to be adjustably secured to the bed 1 of the lathe through the block 2, which is provided on its under side with ways 3, which fit and slide upon the ways 4 of the lathe bed, in substantially the same manner as the ordinary tail-piece of the lathe is fitted to the bed. The upper face of the block 2 is provided with a cross groove 5 to receive the spline 6 upon the lower face of the turret frame 7. T-headed slots 8 are provided in the lower face of the frame 7 to receive the T-headed bolts 9 which pass through apertures 10 in the block 2 and are located in the longitudinal slot 11 of the lathe bed 1, to receive upon their lower screw threaded ends the hand nuts 12, by which the frame 7 and the block 2 are secured in their adjusted positions upon the lathe bed 1. As a means for cross feeding the turret frame 7, I provide a cross slot 13 in the block 2 to receive a stud bolt 14 screwed into the turret frame 7, as clearly shown in Figs. 14 and 15. Screwed horizontally into the block 2, in alinement with said stud bolt 14, are the two adjusting bolts 15 and 16, which impinge upon opposite sides of said stud bolt 14. With the hand nut 12 slightly loosened, the cross feed screws 15 and 16 may be utilized for cross adjusting the turret frame 7 to correct position, while the block 2 may be slid along the ways 4 of the lathe bed 1 for longitudinal adjustment. When both cross and longitudinal adjustments have been made, the hand nuts 12 may be screwed home and thus the turret frame 7 and block 2 be firmly secured in their adjusted positions.

The turret frame 7 is provided with the two annular stanchions 17 and 18, integrally connected together by the stiffening bar 19. These annular stanchions are split as at 20, and provided with the lugs 21, so that the annular stanchions may be slightly reduced in diameter through the means of the bolts 22 screwed into the lugs 21. Within these annular stanchions 17 and 18 are fitted the bearing glands 23 and 24, which are short thimblelike cylinders with a slightly conical bore. When these glands 23 and 24 are secured in place, the bolts 22 are screwed up tightly and thus said glands are firmly secured within the annular stanchions against accidental displacement. Within the two glands 23 and 24 is located the rotating turret barrel 25 which has its central portion cylindrical as shown at 26 in Fig. 8, and its ends slightly coned as at 27 and 28, to fit the conical bores respectively, of the glands 23 and 24. With the parts just described properly assembled and adjusted, the turret barrel 25 will have no longitudinal movement with respect to the glands 23 and 24, yet said barrel may revolve freely within said glands.

The barrel 25 is provided with a plurality of cylindrical apertures 29 running from one end of the barrel to the other. In the present case, I have shown five apertures to receive the five spindles 30. The spindles 30 are cylindrical in shape and are nicely and firmly fitted into the thimbles 31 and 32 in the ends of the apertures 29. The thimble 31 has a smaller internal diameter to receive the small diameter of the spindle 30, such spindle having the enlarged diameter 33 at its inner end so as to form a shoulder 34, and between said shoulder 34 and the inner end of the thimble 31 is located the compression spring 35, the tendency of which is to force the spindle into its innnermost position, as illustrated in Fig. 5. In order to limit the inward thrust of the spindles 30, I provide upon the inner end of the barrel 25, a spider 36, the arms of which project radially from the center of the barrel partially across the inner ends of the apertures 29. The spindles 30 are provided with longitudinal slots 37 to receive the arms of the spider 36 with the inner shoulders 38 of said slots abutting against the inner face of the spider arms. This forms a convenient method of limiting the inward thrust of the spindle 30 due to the expansion of the spring 35. The slots 37 open into an axial screw threaded aperture 38′ in the end of the spindle into which is screwed the adjusting bolt 39.

The set nuts 40 are located upon screws 39 so that, when said set nuts are properly adjusted, they will prevent any disarrangement of the screws 39. It is to be understood that the spindles 30 as they appear, Fig. 5 are intended to be pushed to the left as shown in said figure, so that the tools held in said spindles may properly operate upon the work piece held in the lathe chuck. The screws 39 are intended to serve as stops to limit the thrust in the spindles 30 by coming in contact with the arms of the spider 36 and thus limit the operation of the tool upon the work piece.

It is to be understood that only a single spindle with its particular tool is to be in operative position at a time; the other spindles being idle; for convenience I have selected the particular spindle lying in the horizontal diameter $x$—$x$ of the turret barrel as illustrated in Figs. 6 and 18. In order to operate this particular spindle while the remaining spindles are left idle I have provided the following mechanism: The side of the annular stanchion 18 is provided with a vertical face as at 41. A bracket 42 held against the face 41 by means of the screws 43 and in order to more firmly brace said bracket, I provide a step 44 which extends horizontally and is firmly secured to the face of the frame 7, by means of a bolt 45. Near the outer end of this bracket 42 is a vertical aperture which forms a bearing for the pin 46. Upon this pin 46 is rigidly secured the lever 47 which is of considerable length as shown in Fig. 2. This lever arches over, as at 48, so as to clear the heads of the bolts 39, which are uppermost in the barrel 25. The lever 47 is provided with a boss or projection 49 which is in alinement with the aforesaid spindle, which for the time being, is located upon the horizontal diameter $x$—$x$ of the turret barrel 25, so that as said lever 47 is swinging upon the pin 46 in a horizontal plane, the projection or boss 49 will impinge upon the head of the proper bolt 39, and thus force outwardly the particular spindle 30 as clearly shown in Fig. 2. This operation, it will be understood, will bring the tool held by that spindle into position to operate upon the work piece held in the lathe chuck.

When the tool has done the work upon the work piece, the lever 47 is thrust back into the position shown in Figs. 1, 3, 4, and 5. Whereupon the corresponding spring 29 will retract the particular spindle 30 within the barrel 25. The next tool must now be brought into position for operation upon the work piece, and I utilize the return swing of the lever 47 for rotating the turret barrel 25 to bring the next spindle with its tool into operative position.

In order to so rotate the turret barrel 25, I employ the following indexing mechanism: Mounted upon the cylindrical portion 26, of the barrel 25, and between the two annular stanchions 17 and 18 is the cylindrical sleeve 50. This sleeve is adjustable circumferentially upon the barrel and when properly adjusted is rigidly secured to said barrel by means of a series of set screws 51, which are screwed into the apertures provided therefor in a knurled collar 52 integral with said sleeve 50. The sleeve 50 has the reduced or stepped diameters as 53 and 54. Upon the first, or larger diameter 53 is the notched index ring 55 which is rigidly secured to the knurled collar 52, by a series of screws 56. This ring is provided with a series of notches 57, in its periphery, equal in number to the number of spindles 30, of the turret barrel. Next outside of the collar and located upon the diameter 53, is the ring 58, said ring being of such diameter as to permit it to revolve upon diameter 53 independent of the ring 55. The ring 58 is provided with a series of gear teeth upon the lower portion of its periphery, as at 59; it is also provided on the side opposite the teeth 59 with the spring pawl 60, said spring pawl normally lying close to the periphery of the ring and rigidly secured thereto by a rivet 61. The pawl is provided with an over-hanging pawl point 62, which projects laterally from the side of the ring as shown in Fig. 11. On the small diameter 54, of the sleeve 50 is located the ratchet ring 63, rigidly held to said sleeve by means of a series of set screws 64. The ratchet ring 63 is provided with a series of teeth 65 equal in number to the number of spindles 30 in the turret barrel. The ratchet teeth 65 are located in position for engagement with the pawl tooth 62 of the ring 58. When the parts are assembled upon the barrel 25, it will be seen that the sleeve 50, index ring 55 and the ratchet ring 63 are rigidly connected together while the ring 58 is revoluble upon the sleeve between the index ring 55 and the ratchet ring 63 with the pawl point 62 in position to engage the teeth 65. If now the ring 58 is intermittently oscillated it will result in a step-by-step rotation of the barrel 25. As a means for producing such intermittent rotation, I provide the following mechanism: Upon the lower end of the pivot pin 46, of the lever 47, is located a cam 66 having a lobe or cam surface 67. Upon the bracket 42, there is pivoted a lever 68, said lever being held in position by means of headed pivot pin 69. This pin projects upwardly for a considerable distance through an aperture in the bracket provided therefor as shown in Fig. 4, so that it lies in the path of an extension 70 and on lever 47 and serves as a stop for said lever. The pin 69 is held in position by means of a set nut 71 screwed in to the side of the bracket as clearly shown in Fig. 4. The lever 68 has upon its shorter arm the antifriction roller 71, in position for engagement with the cam lobe 67 of the cam 66, which being rigidly connected to the pivot pin 46 will swing around with the lever 47 from the position shown in Fig. 2 to the position shown in Fig. 1, so that when the lever 47 is in the position shown in Fig. 1 the lever 68 will be thrown in the position also shown in Fig. 1. Connected to the arm of the lever 68, by means of the link 72, is the rack 73, which slides in a groove 74 provided therefor in the base of the frame 7. This rack meshes with the gear teeth 59 of the ring 58, heretofore referred to. Connected to the outer end of the rack 72 by means of the pin 75 is a tension spring 76, the opposite end of which extends across the bed of the frame, beneath the ratchet ring 63, and is connected to the opposite side thereof by means of a hook 77. The purpose of this spring is to restore the rack and its actuating lever 68, together with the ring 58 to the positions shown in Fig. 2 when the lever 47 is swung back. It will now be seen that the oscillation of the lever 47 from the position shown in Fig. 2, to that shown in Fig. 1 will result in drawing the rack 73 across the bed of the frame, and with it will rotate the turret barrel 25 by means of the pawl and ratchet mechanism mounted upon the periphery of the barrel.

Some means must be provided for holding the turret barrel in its adjusted position and prevent it from turning back by the friction of the parts when the rack 73 and lever 68 returns to the positions illustrated in Fig. 2; for this purpose I have provided an index stop mechanism which consists of the following parts: Extending laterally from the annular stanchion 17 is a split bracket bearing 78, which receives a stub bearing shaft 79, upon the end of which is rigidly mounted the index stop lever 80 shown in detail in Figs. 18 and 19. This index stop lever is provided with a wedge shaped pin 81, directed toward the axis to the barrel 25, and designed for engagement with the notches 57 of the ring 55. When so engaged, it will be seen that the barrel 25 is locked, but when disengaged the barrel 25 may revolve freely by means of the rack 73. When it becomes necessary to release this lock in any way, the barrel may be indexed ahead, and a lock trip mechanism is provided which will be hereinafter described. In order to yieldingly hold the locking pin 81 in the notches 57, I provide a spring 82, securing the same to the frame of the machine, the outer end thereof bearing upon the index lever 80 as shown in Figs. 18 and 19. This serves to effectually hold the locking pin 81 in the notch 57 until otherwise released or tripped. The bearing for the shaft 79 is of novel type and is fully illustrated in Fig. 20. The shaft 79 is provided with a cone 83, integral therewith and also a loose or adjustable cone 84, adjustably held upon the outer end of the shaft by means of a split nut 85; upon the cones 83 and 84 is located a bearing sleeve 86 which is provided with a cone bearing surface to fit the cone parts 83 and 84. This bearing sleeve 86, is held in the split bearing bracket 78 and the index lever 80 is secured upon the end of the stub shaft 79, by a set screw 80', when the sleeve 86 is adjusted in the bearing bracket to a position to bring the locking pin into registry with the notches 57 of the index ring 55, after which the bolts 87 are screwed up to clamp the sleeve 86 within the split bearing bracket 78.

The index locking mechanism is tripped by the following means: Upon the outer end of the bracket 42 is located a pivoted knuckle, 88 held in position by a pivot pin 89. The contour of such knuckle is fully shown in Figs. 16 and 17. To the outer end of the knuckle 88 is pivotally connected a rod 90, said rod extends longitudinally of the machine through an apertured guide lug 90', provided therefor, upon the bracket 42, and between the bracket 42 and the vertical face 41 and finally passes through the apertured guide lug 91, extending from the side of the annular stanchion 17, and between the head 92 upon the end of the said rod 90 and the guide lug 91, is located a compression spring 93, the purpose of which is to draw the rod 90 to the left as seen in Figs. 16 and 17. The side of the rod 90, adjacent to index lever 80 is notched out as at 94. The end of such notch is inclined or cam shaped as at 95. Projecting inwardly from the lever 80, is the pin 96, in position to engage the notch 94 of the rod and to ride up on the cam 95, as the rod 90 is shot to the right (Fig. 17). This will throw the lever back and trip the pin 81 from the notch 57 of the ring 55. Thus the locking mechanism for the barrel 25 is released or tripped.

The means for reciprocating the rod 90 consists of the following mechanism: Pivoted in to the knuckle 88, is a short arm or lever 98 carrying at its outer end the antifriction roll 99, which lies in the path of the cam lobe 100 upon the cam 66. Surrounding the downwardly projecting boss 101 of the knuckle 88 is a coil spring 102, the end of which bears upon the side of the knuckle, while the opposite end bears upon the opposite side of the arm 98. The tendency of this spring 102 is to hold the arm 98 against the stop pin 103, located in the knuckle 88 as clearly shown in Figs. 4, 16, and 17. When the arm 47 is in the position shown in Figs. 2 and 16, the index lever 80 will be in the position shown in Figs. 2, 16, and 18. If now the lever 47 is swung around in the position shown in Fig. 1 the cam lobe 100 will bear upon the antifriction roll 99 turning the knuckle 88 into the position shown in Fig. 17, causing the pin 96 to ride upon the cam surface 95 of the rod 90, thus throwing back the lever 80 with its wedge pin 81 out of notch 57 of the index ring 55. As the lever 47 travels farther from the position shown in Fig. 17 the roll 99 will travel across the circular arc of the cam lobe 100 and during this time the knuckle 88 and the rod 90 will remain stationary, thus holding the lever 80 in a retracted position; but when the lever 47 finally reaches the position shown in Fig. 1, the roll 99 will have traveled around the cam lobe 100, and reached the notched part 104, in which position the rod 90 and the knuckle 88, will have snapped back into the position shown in Fig. 1 under the influence of the spring 93. This, of course, permits the index lever 80, under the influence of its spring 82 to fall back into the position shown in Fig. 18 with the wedge pin 81 in the corresponding notch 57 of the index ring 55. In the meantime the swinging of the lever 47 has caused the cam lobe 67 to operate the lever 68 and the rack 73, which in turn rolls the barrel 25 one step ahead. When the lever 47 is swung backward from the position shown in Fig. 1, to that shown in Fig. 2, the arm 98 will swing upon the pivot away from the stop pin 103 without in any way affecting the rod 90. It will thus be seen that the entire manipulation of the turret may be accomplished by swinging the lever 47 through an arc of 90 degrees; but at each successive swing of such lever and its depression of the head of the bolt 39, the corresponding spindle 30 will be shot forward, while the reversal of the swing of such lever will properly index the turret barrel. In Fig. 22 I have shown a slight modification of the mechanism for throwing the index lever 80 forward. This consists merely in providing the lower end of the lever with a socketed arm 105, in which is located one end of the compression spring 106, the opposite end of which extends into an aperture 107 in the face of the frame 7. Its operation will be readily understood.

If it is desired to adjust the barrel 25 so as to bring the active spindle 30 above or below the horizontal diameter $x$—$x$ of the barrel, this may be accomplished by loosening the set screws in the collar 52 of the sleeve 50. The barrel 25 may then be rotated freely within the sleeve 50 and adjusted to any desired position within limits; after which the set screws may be screwed home and the device is ready for operation again.

In Fig. 6 and several of the other figures there are shown a series of screws 108 and 109 passing through the flange of the cone bearing 24. These screws are for the purpose of adjusting longitudinally the bearing 24 within the stanchion 18. The set of screws 108 pass through apertures in the flange of the bearing 24 and are screwed into the face of the stanchion 18, while the set of screws 109 are merely screwed through the flange of the bearing 24 and bear with their inner ends upon the face of the stanchion 18. It will be readily seen that by screwing up the set of screws 108 they will force the bearing 18 into the annular stanchion and up on the cone 28 of the barrel 25. When the bearing is correctly adjusted the screws 109 are screwed home against the face of the annular stanchion 18 and thus serve to hold the bearing in accurate adjustment. If for any reason the bearing 24 should stick within the annular stanchion the screws 108 may be entirely withdrawn and the screws 109 used to force the bearing free from the stanchion, as will be readily understood.

In Fig. 7 I have shown a slight modification of the means for adjusting the turret barrel bearings; in this case the bearing 23, for the outer end of the turret barrel is the same as illustrated in Fig. 5. The bearing 110 for the other end of the barrel is screw threaded upon its external cylindrical surface, and the annular stanchion 18 is screw threaded to receive the bearing 110, as clearly illustrated in Fig. 7. It will be readily understood that the bearing 110 may be screwed into said annular stanchion and thus the adjustment of the barrel bearings is accomplished.

From the extremities of the stiffening bar 19, I provide vertical oil holes 111, into which are inserted the caps 112. Lubricant may be introduced into the oil holes or cavities 111 and thus the bearings 23 and 24 for the cone ends in the barrel 25 may be lubricated.

From the above description the following features will be readily apparent: The turret frame may be adapted to any of the modern bench or speed lathes. The mounting of the turret frame upon a block or shoe which fits the lathe bed permits a cross movement of the turret frame, whereby a quick alinement of the tool spindles with the center of the lathe head stock may be readily accomplished. The location of the tool spindles concentrically around the axis of the turret barrel permits a very much longer tool spindle and consequently a much more stable and rigid support for the tools carried by the spindle. The tool spindles are individually set and adjusted independent of the other spindles and the adjusting of one spindle does not in any way interfere with the longitudinal adjustment or with the travel of any other spindles.

Another feature which I regard as important resides in the fact, that when a tool is operated by the lever 47, only the light rigid spindle opposed by a light compression spring is moved and for that reason the sensitiveness and delicacy of operation are materially increased. When desired the turret barrel may be easily disengaged, turned and indexed by hand, by simply releasing the indexing arm 80 with its wedge pin 81 from the notch 57 of the indexing ring 55. This is very convenient when only a part of the tool spindles are required for operation upon any specific work piece.

I claim:

1. In a lathe turret, the combination of a revoluble cylindrical turret barrel having a plurality of spindle bearings therein parallel with its axis, a reciprocating tool spindle in each of said bearings, a spring surrounding and bearing upon each of said spindles to withdraw the same within their respective bearings, a hand lever for consecutively reciprocating said spindles in their bearings against the pressure of their respective springs, and means actuated by the reversal of said hand lever for intermittently rotating said barrel.

2. In a lathe turret, the combination of a revoluble cylindrical turret barrel, a plurality of reciprocating tool spindles in said barrel, a spring surrounding and bearing upon each of said spindles to withdraw the same within said barrel, a hand lever for consecutively reciprocating said spindles against the pressure of their respective springs, and means actuated by the reversal of said lever for giving said barrel a step-by-step rotation in one direction.

3. In a lathe turret, the combination of a frame provided with annular stanchions, a cylindrical barrel revolubly mounted in said stanchions, a plurality of tool spindles in said barrel parallel to the axis thereof, a hand lever pivoted upon said frame for consecutively reciprocating said spindles, and a means actuated by the reversal of said lever for giving said barrel a step-by-step rotation in one direction.

4. In a lathe turret the combination of an adjustable bed, a frame adjustably secured to said bed, a pair of annular stanchions upon said frame, a turret barrel revolubly mounted in said stanchions, reciprocating spring pressed spindles in said barrel, a hand lever pivoted upon said frame for actuating said spindles in one direction, means actuated by the reversal of said lever to give said barrel a step-by-step rotation in one direction and means for locking said barrel against rotation.

5. In a lathe turret, the combination of a frame, a pair of annular stanchions upon said frame, a cylindrical turret barrel revolubly mounted in said stanchions, a locking ring adjustably but rigidly secured to said barrel, an arm pivotally mounted upon said frame adjacent to said ring, for locking engagement therewith, and means for successively unlocking said arm from said ring and giving said barrel a step-by-step rotation in one direction.

6. In a lathe turret, the combination of a frame, a cylindrical turret barrel mounted in said frame to rotate upon its axis, a locking arm pivoted upon said frame for locking said barrel against rotation, means for unlocking said barrel, and thereafter giving it a partial rotation in one direction and a hand lever for actuating said unlocking and rotating means.

7. In a lathe turret, the combination of a cylindrical turret barrel, mounted to rotate upon its axis, a locking ring rigidly but adjustably secured upon said barrel, an arm pivoted adjacent to said ring for locking engagement therewith, cam actuated mechanism for unlocking said arm from said ring and for giving said barrel a partial rotation in one direction, and a hand lever for operating said cam actuated mechanism.

8. In a lathe turret, the combination of a cylindrical turret barrel, mounted to rotate upon its axis, locking mechanism for locking said barrel against rotation, a reciprocating rod having a cam thereon for releasing said locking mechanism and a rack and pinion for partially rotating said barrel upon the release of said locking mechanism.

9. In a lathe turret, the combination of a cylindrical turret barrel, a locking ring rigidly but adjustably secured to said barrel, a locking pin located adjacent to said ring for locking engagement therewith, means for releasing said pin from locking engagement, and pawl and ratchet mechanism for partially rotating said barrel when said locking mechanism is released.

10. In a lathe turret, the combination of a rotatable cylindrical turret barrel, a plurality of reciprocating tool spindles mounted in said barrel parallel to its axis, a lever pivoted adjacent to said barrel, means actuated by the throw of said lever in the one direction to rotate said barrel to bring said spindles successively in position for engagement with and reciprocation by said lever upon its reverse throw.

11. In a lathe turret, the combination of a rotatable cylindrical turret barrel, a plurality of reciprocating tool spindles mounted in bearings in said barrel parallel to and concentric with its axis, a spring surrounding each of said spindles for withdrawing said spindles into said barrel, and a hand lever pivoted adjacent to said barrel for successively projecting said spindles from said barrel against the action of said springs and means actuated by the reversal of said lever to rotate said barrel.

12. In a lathe turret, the combination of a frame having a pair of annular stanchions, a rotatable turret barrel located in said stanchions, a plurality of tool spindles concentrically arranged within said barrel, a hand lever pivotally mounted upon said frame adjacent to one end of said barrel in position for consecutive engagement with the ends of said spindles, and means actuated by said lever for rotating said barrel step-by-step to bring said spindles successively into position for engagement by said lever.

13. In a lathe turret, the combination of a turret frame provided with a pair of upright annular stanchions, a cylindrical turret barrel rotatably mounted in said stanchions, pawl and ratchet mechanism upon said barrel, manually operated means for actuating said pawl and ratchet mechanism to give said barrel a step-by-step rotation, means for locking said barrel against accidental rotation and cam mechanism actuated by said manually operated means for releasing said locking means to permit the rotation of said barrel.

14. In a lathe turret, the combination of the frame having a pair of upwardly projecting annular stanchions, a cylindrical turret barrel rotatably mounted in said stanchions, a locking ring having a plurality of locking notches in the periphery, said locking ring being adjustably secured to the periphery of said barrel, an arm pivotally mounted upon said frame adjacent to said locking ring, a locking pin secured in said arm in position for engagement with the notches in said locking ring, means for oscillating said arm upon its pivot to release said locking pin from the respective notches in said ring, means for giving said barrel a step-by-step rotation when said locking pin is released and means for throwing said arm and its locking pin into locking engagement with one of said notches at the end of each partial rotation of said barrel.

15. In a lathe turret, the combination of a turret frame having a pair of annular stanchions projecting upwardly therefrom and integral with, a cylindrical turret barrel rotatably mounted in said stanchion, a ratchet ring rigidly secured to said barrel, a pawl ring mounted upon said barrel, said pawl ring having a pawl in position for engagement with the ratchet ring, gear teeth upon said pawl ring, a reciprocating rack upon said frame having its teeth in engagement with the teeth of said pawl ring, cam mechanism for reciprocating said rack to oscillate said pawl ring and thereby intermittently rotate said turret barrel and a hand lever for actuating said cam mechanism.

16. In a lathe turret, the combination of a turret frame having a pair of upwardly projecting annular stanchions, a turret barrel rotatably mounted in said stanchions, mechanism for locking said barrel against rotation, cam actuated mechanism for releasing said locking mechanism mounted upon said turret frame, pawl and ratchet mechanism upon said turret barrel and a hand lever upon said frame for operating said cam actuated mechanism to release said locking mechanism and for actuating said pawl and ratchet mechanism to intermittently rotate said barrel.

17. In a lathe turret, the combination of a frame having a pair of upwardly projecting annular stanchions, a cylindrical turret barrel rotatably mounted in said stanchions, locking mechanism upon said frame for locking said barrel against rotation, cam actuated mechanism upon said frame for releasing said locking mechanism and for intermittently rotating said barrel and a hand lever mounted upon said frame for operating said cam mechanism.

18. In a lathe turret, the combination of a cylindrical turret barrel rotatable upon its axis, said barrel having a plurality of apertures therein parallel to and concentric with its axis, a shouldered bearing in one end of each of said apertures, a shouldered tool spindle in each of said bearings, a coiled compression spring in each of said apertures surrounding said spindles and bearing upon the shoulder thereof and upon the corresponding bearing, said spindles each being provided with an axial aperture and an adjustable bolt screwed into said aperture and limiting means upon said barrel for engagement with each of said bolts to limit the longitudinal reciprocation of said spindles respectively.

19. In a lathe turret, the combination of a cylindrical turret barrel rotatable upon its axis, said barrel having a plurality of apertures therein parallel to and concentric with its axis, tool spindles located in said apertures, each of said spindles being provided with screw threaded axial apertures, and radial slots opening into said apertures, adjusting bolts screwed into said apertures, a spider rigidly secured to the end of the said turret barrel, said spider having arms projecting into the radial slots of said spindles, whereby the longitudinal reciprocation of said spindles may be limited between the ends of the slots and the adjacent ends of said bolts.

20. In a lathe turret, the combination of a cylindrical turret barrel, said barrel having a plurality of apertures therein parallel to and concentric with its axis, tool spindles in said apertures, each of said tool spindles being provided with a radial slot in one end thereof, a spider rigidly secured in the axis of said barrel, said spider having arms projecting into the radial slots of said spindles and means for reciprocating each of said spindles in its apertures.

21. In a lathe turret, the combination of a cylindrical turret barrel, said barrel having a plurality of apertures therein parallel to and concentric with its axis, a spider secured to the end of said barrel in its axis, said spider being provided with radial arms projecting partially across said apertures, longitudinally slidable spindles located in said apertures, said spindles being provided with radial slots to receive the arms of said spider, springs within said apertures surrounding said spindles and bearing thereon to press the same with the closed ends of their respective slots against the corresponding arms of said spider.

22. In a lathe turret, the combination of a turret frame having a pair of annular stanchions integral therewith, a cylindrical turret barrel rotatably mounted in said stanchions, said barrel having a plurality of apertures therein parallel to and concentric with its axis, longitudinally slidable tool spindles located in said apertures, adjusting bolts screwed axially into said spindles, a lever pivotally mounted upon said turret frame, said lever having a projection thereon for engagement successively with the projecting ends of said bolts, means actuated by the oscillation of said lever in one direction to rotate said barrel, to bring said spindles successively into position for contact of their respective bolts with the projection on said lever when it oscillates in the opposite direction.

23. In a lathe turret, the combination of a cylindrical turret barrel rotatable upon its axis, said barrel having a plurality of longitudinally slidable tool spindles therein, having adjusting bolts in their ends, indexing mechanism located adjacent to said barrel, a lever pivoted adjacent to said barrel, means actuated by the oscillation of said lever in one direction to index said barrel and a projection on said lever for contact successively with said bolts when said lever is oscillated in the opposite direction.

24. In a lathe turret, the combination of a turret frame having a pair of upwardly extending annular stanchions, adjustable bearings in said annular stanchions, a cylindrical turret barrel rotatably mounted in said bearings, an adjustable indexing ring secured to the circumference of said barrel, a lever pivotally connected with said frame and means connecting said lever with said indexing ring for giving said barrel a step-by-step rotation.

25. In a lathe turret, the combination of a turret frame having a pair of upwardly extending annular stanchions integral therewith, a cylindrical turret barrel rotatably mounted in said annular stanchions, a bracket secured to one of said stanchions, a lever pivotally mounted upon said bracket, a cam rigidly connected to said lever, a second lever pivoted to said bracket having an arm in position for engagement with said cam, a rack mounted upon said frame to slide thereon in a plane perpendicular to the axis of said turret barrel, a ring mounted upon the circumference of said barrel, said ring having gear teeth for engagement with the teeth of said rack, pawl and ratchet connections between said ring and said turret barrel and a connection between said rack and said lever whereby the oscillation of said first named lever upon its pivot will actuate said rack to give said turret barrel an intermittent step-by-step rotation upon its axis.

26. In a lathe turret, the combination of a turret frame having a pair of upwardly projecting annular stanchions, a cylindrical turret barrel rotatably mounted in said annular stanchions, a plurality of longitudinally slidable spindles concentrically located in said barrel, a sleeve rigidly secured upon said barrel between said stanchions, an index ring provided with a series of notches in its periphery, said ring being rigidly secured to said sleeve, a ratchet ring rigidly secured to said sleeve, a pawl ring rotatably mounted upon said sleeve between said ratchet ring and said index ring, a spring pawl upon said pawl ring, said pawl being located in position for engagement with said ratchet ring, gear teeth upon said pawl ring, an index locking pin pivotally mounted upon said frame for engagement with the notches of said index ring, a laterally slidable rack located upon said turret frame in position for engagement with the gear teeth of said pawl ring, means located upon said frame for releasing said pin from engagement with said index ring and for reciprocating said rack, whereby said turret barrel is given an intermittent step-by-step rotation in one direction.

27. In a lathe turret, the combination of a turret frame having a pair of upwardly projecting annular stanchions, a turret barrel rotatably mounted in said annular stanchions, a sleeve mounted upon said turret barrel between said stanchions, locking mechanism mounted upon said frame for locking said sleeve against rotation and means for adjustably but rigidly securing said barrel within said sleeve.

28. In a lathe turret, the combination of a turret frame having a pair of upwardly projecting annular stanchions, a turret barrel rotatably mounted in said stanchions, said turret barrel having a spindle aperture therein parallel with its axis, a sleeve mounted upon the circumference of said barrel between said stanchions, means upon said frame for locking said sleeve against rotation, means for adjustably securing said barrel within said sleeve so as to bring the axis of said aperture in a definite position with respect to a horizontal plane passing through the axis of said barrel.

29. In a lathe turret, the combination of a frame having a pair of upright annular stanchions thereon, a cylindrical turret barrel rotatably mounted in said stanchions indexing and locking mechanism for alternately rotating and locking said barrel against rotation, an oscillating cam for alternately actuating said indexing and locking mechanism and a hand lever for operating said cam.

30. In a lathe turret, the combination of a frame having a pair of annular stanchions thereon, a cylindrical turret barrel rotatably mounted in said stanchions, an indexing ring rigidly secured upon said barrel, a locking lever for engaging said ring, gear actuated pawl and ratchet mechanism for rotating said barrel in said stanchions, an oscillating cam mechanism actuated by said cam for simultaneously unlocking said locking lever, and operating said gear actuated mechanism to partially rotate said barrel and a hand lever for operating said cam.

31. In a lathe turret, the combination of a rotatable cylindrical turret barrel, a lever actuated cam pivotally mounted adjacent to said barrel, a lever actuated by the oscillation of said cam, and means operated by the movement of said lever to rotate said barrel, and indexing mechanism operated by said cam to alternately lock and release said barrel.

32. In a lathe turret, the combination of a revoluble cylindrical turret barrel, a plurality of tool spindles concentrically arranged at equal distances apart around the axis of said cylinder, an oscillating hand lever pivoted adjacent to said barrel, means actuated by the swing of said lever in one direction to reciprocate one of said spindles in said barrel, and means actuated by the swing of said lever in the opposite direction to partially rotate said barrel to bring the next succeeding spindle into position for actuation by the next swing of said lever.

33. In a lathe turret, the combination of a turret frame provided with a pair of annular stanchions, a turret barrel rotatable within said stanchions, means for giving said barrel equal partial rotations, locking ring upon said barrel, locking mechanism upon said frame for engagement with said ring to lock said barrel at the end of each partial rotation thereof, and means for circumferentially adjusting said barrel within said ring.

34. In a lathe turret, the combination of a turret frame having a pair of horizontally alined annular stanchions thereon, a turret barrel having a cylindrical body rotatably mounted in said annular stanchions, a sleeve secured upon the cylindrical body of said barrel, means for alternately locking and rotating said sleeve and barrel and means for circumferentially adjusting said sleeve and barrel.

<div style="text-align:right">PLINY CATUCCI.</div>

Witnesses:
 Louis M. Sanders,
 Rosa Scully.

---

Copies of this patent may be obtained for five cents each, by addressing the "Commissioner of Patents, Washington, D. C."